Patented July 28, 1936

2,049,072

UNITED STATES PATENT OFFICE 2,049,072

LUBRICANTS

Louis A. Mikeska and Luther B. Turner, Elizabeth, N. J., assignors to Standard Oil Development Company, a corporation of Delaware No Drawing. Application August 29, 1933, Serial No. 687,311

13 Claims. (Cl. 87—9)

This invention relates to improved lubricants and to methods of preparing same. More particularly it relates to the preparation of lubricants by blending with a mineral oil the product obtained by esterification of hydroxy groups in natural or synthetic fatty acids or glycerides, with special reference to castor oil, with or without subsequent stabilization of said esterified product as by hydrogenation.

Castor oil possesses certain desirable properties as a lubricant and has been used with moderate success alone for this purpose, but repeated attempts to use it in combination with mineral oils have not met with the desired degree of success. The reason for this partial failure is primarily the insolubility of the castor oil in mineral oils, although under severe conditions castor oil itself and also mixtures of castor oil and mineral oil are not as stable as might be desired. This latter objection is evidenced by a certain tendency to "gum up" the engine or other machine in which such lubricants are used.

The present invention eliminates many, if not all, of the disadvantages which have heretofore attended the use of blends of castor oil and mineral oil and attains new results by way of increased miscibility, viscosity and stability.

In carrying out the invention the hydroxy compound, represented typically by castor oil, is esterified by any desired organic acid or a mixture of several acids, or their anhydrides or chlorides, etc., in such a manner that the esterification product will have the desired predetermined viscosity characteristics. Instead of using castor oil, other natural oils containing hydroxy groups may be used, such as quince oil or mono-, di-, or poly-hydroxy stearic acid, ricinoleic acid, and the like, which may be either produced synthetically or may be obtained from any natural oils in which they occur. Glycerides of the hydroxy acids formed by the oxidation of paraffin wax and other hydrocarbon compounds may be used.

It is preferable that the treatments involved in the present invention be applied to compounds containing hydroxy groups in the form of glycerides or their polymerized products or other suitable esters such as those of glycols, polyglycols, polyglycerols, chlorhydrins, alcohols, amino hydroxy compounds, estolides, lactones, lactides, and the like, or derivatives thereof; although it may be desirable under some circumstances to treat these compounds in the form of fatty acids and subsequently esterify them with suitable hydroxy or amino compounds such as those mentioned, as well as glycerol or its substituted derivatives, to form the esters which are more stable under conditions of use as lubricants than would be the corresponding fatty acids.

The acids to be used for the esterification reaction may be selected from a wide variety of organic acids. Aliphatic fatty acids such as acetic, butyric, oleic, stearic and the like, or aromatic acids such as benzoic, phthalic, etc. may be used. The acids may be mono-, di-, or polybasic; two examples of di-basic acids being phthalic and sebacic acids. It may also be desirable to use mixed or substituted acids or acid products derived from natural oils, fats, waxes, and similar substances; for example, the acids derived by extraction from or hydrolysis of corn oil, castor oil, lard oil, and the like. Another suitable source of acids is the product obtained by oxidation of hydrocarbons such as paraffin wax and various oils.

In selecting the acid to be used for esterification, the viscosity characteristics of the product are a controlling factor. For example, if it is desired to esterify castor oil which has a viscosity of about 98 seconds at 210° F. in such a manner as to obtain a product having a viscosity of 300 seconds at 210° F., one may either select an acid of proper molecular weight which will give exactly the desired viscosity in the esterified product or one may first partially esterify with a high molecular weight acid such as a long chain fatty acid or an acid such as phthalic acid, until approximately the desired viscosity is obtained, and then complete the esterification with a low molecular weight acid such as acetic acid in order to eliminate the residual hydroxy groups in the compound being treated. It is desirable that enough of the hydroxy groups be esterified to produce a product which will be completely soluble in mineral oils, including oils of the paraffinic type such as Pennsylvania lubricating oils. Although it is not desired that the invention should be limited by any theories as to the mechanism of the actions involved, it is believed that the use of di-basic acids such as phthalic acid, sebacic acid, and the like, may tend to produce a long chain type of ester resembling certain polymers and resins in their general structure. This may explain the unusually high viscosities obtained when esterifying such acids. Excessive amounts of the dibasic acids cause insolubility in mineral oils.

In carrying out the esterification reaction, either organic acids themselves may be used or their corresponding anhydrides or chlorides, and the like. Inorganic acids may also be used as esterifying agents, for example, phosphoric acid ($H_3PO_4$), boric acid ($H_3BO_3$), etc. It may be desirable under some circumstances, to use an esterification catalyst such as sulfuric acid, hydrochloric acid, boron fluoride, etc.

The temperature at which the reaction should be carried out depends upon the esterifying agent being used. For low molecular weight acids the temperature range will be between 100–150° C. In this case, a catalyst (0.1 to 1.0%) will very greatly increase the reaction rate. With the higher molecular weight esterifying agents, the temperature necessary to give a suitable reaction rate will be 180–220° C. In this case, no catalyst is necessary. The proportion of the reactants depends entirely upon the product desired. With mono-basic acids the OH groups may be entirely esterified, using approximately three mols of the acid per mol of castor oil. With di-basic acids the amount used depends upon the desired viscosity of the finished product. Very good results have been obtained with one mol of the esterifying agent per mol of castor oil. Of course, more or less can be used. Solvents or diluents may be used but in most cases are not necessary. Pressure (5–10 atmospheres) may be employed with advantage only with lower molecular weight acids in order to get the temperature high enough for a satisfactory reaction rate.

After carrying out the esterification treatment as described above, the product may be still further stabilized by saturation of at least a part of the double bonds by hydrogenation or other suitable treatment. This may be carried out at atmospheric or superatmospheric pressure and at room temperature or slightly elevated temperature but not at sufficiently high temperature to cause any substantial decomposition of the product being treated. Suitable hydrogenation catalysts may be used such as nickel, copper, palladium, and other metals or their oxides. Such catalysts may be prepared according to methods already known to the art. It may be desirable, under some circumstances, to carry out the hydrogenation only until the desired improvement in stability is obtained but without carrying it to such an extent as to completely saturate the double bonds in the product being treated, that is, to stabilize only the most active double bonds. The advantage of such partial hydrogenation is that the pour point of the product or its blend with mineral oil may be kept down below any desired maximum.

Instead of hydrogenation, other stabilizing treatments may be applied, such as halogenation, alkylation, arylation, or hydroxylation followed by esterification. The order of applying the treatments may be varied to some extent. Although, as in the case of castor oil, it is best to esterify first so that the OH group is not hydrogenated, yet under some circumstances the treatments may be carried out simultaneously or even in reverse order.

The products obtained by the treatments hereinbefore described, namely, the esterification alone or with stabilization, may be used alone as lubricants or preferably blended with mineral oils or made into greases by adding soaps, etc., for example, 2 to 30% of lime, sodium, or lead soaps of fatty or naphthenic acids. The amount of esterified product to be blended with the mineral oil may vary over a wide range depending upon the individual materials being blended and upon the intended use of the blended product. Generally, from 5 to 50%, more or less, of the esterified product will be sufficient to impart the desired characteristics to the mineral oil.

The consistency and other properties of the resultant blends may be so regulated as to obtain either fluid lubricating oils or viscous greases and it is of course understod that various other addition agents well known to the art may be added if desired, such as oxidation inhibitors, pour inhibitors, dyes, soaps, thickening agents, sludge dispersing agents, etc.

For the purpose of illustration only and not with the intent of limiting the invention, the following examples are given:

Example 1

A sample of castor oil was acetylated by warming it with 3 mols of acetyl chloride for about an hour. The reaction product was washed and dried and was found to be miscible with mineral oils at low temperature. The viscosity data for the treated and untreated oil are given below:

| Original castor oil sample A | Treated oil |
|---|---|
| Vis./100° F _____ 1540 Sec. Say. | Vis./100° F _____ 385.6 |
| Vis./210° F _____ 96 Sec. Say. | Vis./210° F _____ 69.0 |
| V. I. _____ 68 | V. i. above _____ 120 |

| Untreated castor oil sample B | Acetylated castor oil |
|---|---|
| Vis./100° F _____ 1244 Sec. Say. | Vis./100° F _____ 569 |
| Vis./210° F _____ 98 Sec. Say. | Vis./210° F _____ 81.25 |
| V. I. _____ 92 | V. I. _____ 129 |

The viscosity index (V. I.) referred to in the above tests and in other tests following refers to the relationship of the viscosity at 210° F. to that at 100° F. and it is desirable in most cases to have a high V. I., in other words, to have a lubricating oil which will have a satisfactory viscosity at high temperature yet without being undesirably viscous at low temperature. (See Chem. & Met., vol. 36, p. 618–9.)

Example 2

Castor oil was first treated with acetyl chloride and subsequently hydrogenated. The following table shows the properties of the original castor oil, of the acetylated castor oil and of the same product after hydrogenation:

| | Pour ° F. | Cloud ° F. | Visc. | | V. I. |
|---|---|---|---|---|---|
| | | | 100° F. | 210° F. | |
| Castor oil | 32 | ------ | 1244 | 98 | 92 |
| Castor oil acetylated | −30 | None | 569 | 81 | 129 |
| Castor oil acetylated and hydrogenated | 30 | 42 | 815 | 96.5 | 125 improved color |

The hydrogenation effected an increase in the viscosity both at 100° and 210° F., raised the pour and cloud temperatures and also improved the color. The increase in stability, as measured by an oxidation test (blowing 5 cu. ft. of air per hour through a 200 gram sample for 4 hours at 450° F.), is shown by the following table:

| Oil | Vis./210 | | | Loss in Wt. % |
|---|---|---|---|---|
| | Before | After | Increase | |
| Pennsylvania | 72 | 94 | 22 | 8.5 |
| Pennsylvania+50% castor | 87 | 156 | 69 | 8.5 |
| Pennsylvania+50% acetylated castor | 75 | 114 | 39 | 9.5 |
| Pennsylvania+50% hydrogenated acetylated castor | 82 | 97 | 15 | 6.5 |

These figures indicate that a Pennsylvania oil showing an increase in viscosity of 22 in the test when blended with 50% castor oil showed an increase of 69 which is undesirably high and indicates a tendency to gum up an engine or other machine in which such a mixed lubricant is used. A blend of the same oil with acetylated castor oil showed an increase of 39, whereas a hydrogenated acetylated castor oil showed an increase of only 15. Thus the hydrogenation reduced the increase in viscosity due to oxidation from 39 to 15 which is even below the corresponding figure for Pennsylvania oil alone. The loss in weight occasioned by the oxidation test was also about 20% lower for the hydrogenated acetylated castor oil blend than for the Pennsylvania oil alone, whereas the acetylated castor oil blend had a slightly higher loss in weight than the Pennsylvania oil alone.

*Example 3*

Castor oil was partially esterified with phthalic acid (200 grams castor oil+10 grams phthalyl chloride) and a product was obtained having a pour point of 0° F., a viscosity of 3515 seconds at 100° F. and 284 seconds at 210° F., giving a viscosity index of 122.

*Example 4*

The hydroxy groups in castor oil were partially esterified with phthalyl chloride and then the esterification was completed with acetyl chloride (400 grams castor oil+54 grams phthalyl chloride+45 grams acetyl chloride). The resultant product had a viscosity of 5040 seconds at 100 F., 375 seconds at 210° F., and a V. I. of 120.

*Example 5*

Sebacic acid $(CH_2)_8(COOH)_2$ was used to esterify castor oil (200 grams castor oil+14 grams sebacic acid) giving a product which had a viscosity of 5222 at 100° F. and 433 at 210° F. with a V. I. of 123.

*Example 6*

When corn oil acids were used to esterify the hydroxy groups of castor oil (500 grams castor oil+375 grams corn oil acids), the product had a viscosity of 2130 at 100° F., 246 at 210° F. and a V. I. of 120. It was completely soluble in mineral oils.

The use of lard oil acids or mixtures such as lard oil and castor oil acids or wax oxidation acids and castor oil acids in all cases resulted in a product having the consistency of a jelly and therefore too viscous for use alone except as a grease-like lubricant, although satisfactory when blended with proper proportions of a mineral oil of suitable viscosity. As stated previously, esterification by means of such relatively high molecular weight acids can be carried out only to the extent of partially esterifying the hydroxy groups, thereby obtaining a product having a viscosity within the desired range and not as viscous as a jelly, and then following such treatment by esterification with a lower molecular weight acid such as acetic acid.

It is not intended that the invention be limited to any of the specific examples hereinabove given or to any theories advanced as to the operation of the invention, but in the appending claims it is desired to claim all novelty in the invention as broadly as the prior art permits.

We claim:

1. Method for producing materials useful as lubricants and blending materials therefor, which comprises at least partially esterifying aliphatic organic materials containing hydroxyl groups with an acid compound selected from the group consisting of saturated and unsaturated straight chain fatty acids and aromatic acids, the acyl halides and anhydrides of such acids, and then at least partially hydrogenating the esterification product.

2. Method according to claim 1 in which the organic material containing hydroxyl groups is also unsaturated.

3. Method for preparing valuable lubricating compounds from aliphatic acids and esters having hydroxyl groups comprising esterifying at least one of the hydroxyl groups with an acid compound selected from the group of straight chain fatty acids, aromatic acids and the acid chlorides and anhydrides of such acids and then hydrogenating the esterified product.

4. Method for producing valuable lubricant blending ingredients from castor oil comprising esterifying the hydroxyl group with an acid compound selected from the group of straight chain fatty acids and aromatic acids and the acid halides and anhydrides of such acids, and then hydrogenating the unsaturated bond of the castor oil.

5. Method according to claim 4 in which the castor oil is esterified with a straight chain fatty acid.

6. Method according to claim 4 in which the castor oil is esterified with an aromatic acid.

7. Method according to claim 4 in which the castor oil is esterified with a dibasic acid.

8. Method according to claim 4 in which the castor oil is esterified with a monobasic acid.

9. The method of preparing blended lubricants from hydroxy group-containing substances of the class comprising natural and synthetic fatty acids and esters, which comprises blending with a mineral lubricant the product obtained by esterifying at least part of the OH groups in said substances with organic acids selected from the group consisting of saturated and unsaturated straight chain fatty acids and aromatic acids adapted to produce esterification products of the desired predetermined viscosity.

10. Method according to claim 9, in which the product is blended with mineral oil.

11. The method of preparing a grease from substances containing hydroxy groups of the class comprising natural and synthetic fatty acids and esters, which comprises blending with a mixture of mineral oil and soap the product obtained by esterifying at least part of the OH groups in said substances with organic acids selected from the group consisting of saturated and unsaturated straight chain fatty acids and aromatic acids adapted to produce esterification products of the desired predetermined viscosity.

12. A lubricant prepared from castor oil by acetylation and subsequent hydrogenation of the acetylated product characterized by complete miscibility with mineral oils at room temperature, a V. I. above 120, a Saybolt viscosity at 210° F. not substantially lower than the viscosity of the original castor oil, and a stability as measured by an accelerated oxidation test superior both to that of the original castor oil and to that of the acetylated castor oil.

13. A lubricant prepared from substances containing hydroxy groups of the class comprising natural and synthetic fatty acids and esters by esterification of said hydroxy groups with an acid compound selected from the group consisting of saturated and unsaturated straight chain fatty acids and aromatic acids and stabilized by subsequent hydrogenation.

LOUIS A. MIKESKA.
LUTHER B. TURNER.